United States Patent [19]

Kochan

[11] Patent Number: 4,689,055
[45] Date of Patent: Aug. 25, 1987

[54] FILTER CLEANING APPARATUS AND METHOD

[75] Inventor: Lee R. Kochan, Fox Point, Wis.

[73] Assignee: Globe-Union Inc., Milwaukee, Wis.

[21] Appl. No.: 65,858

[22] Filed: Aug. 13, 1979

[51] Int. Cl.$^4$ .............................................. B01D 46/04
[52] U.S. Cl. ........................................... 55/96; 55/294
[58] Field of Search ...................... 134/21; 55/96, 284, 55/294, 302, 350, 484; 210/493

[56] References Cited

U.S. PATENT DOCUMENTS

| | | | |
|---|---|---|---|
| 2,695,681 | 11/1954 | Boesger | 55/287 |
| 3,242,656 | 3/1966 | Murphy | 55/500 |
| 3,482,378 | 12/1969 | Noland | 55/302 |
| 3,545,180 | 12/1970 | Schrag | 55/292 |
| 3,757,499 | 9/1973 | Scott | 55/500 |
| 3,871,845 | 3/1975 | Clarke et al. | 55/302 |
| 4,023,943 | 5/1977 | Kipple et al. | 55/467 |
| 4,203,738 | 5/1980 | Kerman | 55/350 |

FOREIGN PATENT DOCUMENTS 2705040  8/1978  Fed. Rep. of Germany ........ 55/302

OTHER PUBLICATIONS

Hedins Mekanisha Satsar pa Amerkanek, Soft Avaskyar, p. 12, in Ornskoldviksall-Ehondra 11 Aug. 1978.

Primary Examiner—Bernard Nozick
Attorney, Agent, or Firm—Oblon, Fisher, Spivak, McClelland, & Maier

[57] ABSTRACT

Apparatus for cleaning a high efficiency particulate air (HEPA) filter includes a vacuum system having a vacuum nozzle which spans the inlet face of the filter and a nozzle inlet lying closely adjacent the filter face. The nozzle inlet is dimensioned to effectively cover one or more two-cell filter modules formed by the filter media separators. A vacuum or induced draft is applied to the nozzle to provide a cleaning air flow counter to the flow of particulate air through the filter. The nozzle temporarily blocks or retards the flow of particulate air through the module or modules being cleaned while the flow and filtering of particulate air continues through the remaining major portion of the filter. Means and their corresponding method of operation for maintaining the nozzle in contact with the filter inlet face and for moving the same across the filter face for sequential cleaning of the filter modules are also disclosed.

25 Claims, 8 Drawing Figures

FILTER CLEANING APPARATUS AND METHOD

BACKGROUND OF THE INVENTION

The present invention relates to apparatus and its method of operation for cleaning fine particulate material from process and/or ventilation air filters. More particularly, the invention pertains to a vacuum cleaning system for a high efficiency particulate air (HEPA) filter operable simultaneously with the filtering mode.

High efficiency particulate air filters, commonly referred to as "HEPA" filters, are well known in the art and are widely used to filter a broad range of fine particulates (down to 0.3 micron) from air or other gases. Typical of the presently used HEPA filter construction is the CAMBRIDGE ABSOLUTE filter manufactured by the Cambridge Filter Corporation. In addition to filtering efficiencies up to 99.99% for particulates as fine as 0.3 micron, HEPA filters are characterized by their relatively simple construction and low operating pressure differential. These filters operate on the basic principle of interception of particulates from the flow of particulate-laden air through the filter media, typically a glass fiber sheet.

As is typical of mechanical interception type filters, the efficiency of a HEPA filter increases with the build-up of entrained particulates on the filter media. Correspondingly, a normal initial pressure drop of from 2 to 6" w.g. across a clean filter will also increase with the build-up of particulate material on the filter media. With a consequent sacrifice in increased power required to maintain uniform air flow, HEPA filters may be operated with increasing efficiencies up to a maximum pressure differential of about 10" w.g. At about this pressure, the filter is susceptible to rupture or other damage and resultant total filter failure.

To extend the filter life and reduce the power consumption, HEPA filters may be periodically cleaned by removing some of the entrained particulates from the filter media. Known methods of cleaning a HEPA filter include backflushing with clean air, vibrating the filter, or a combination of the two. Use of either method requires the flow of particulate air through the filter to be stopped during cleaning. In a single filter unit, interruption of the particulate air flow may require temporary process shutdown, use of an alternate filter, or the exhausting of particulate air to the atmosphere. The complications often attendant process shutdowns, the high cost of standby equipment, and the problems of air pollution make the known methods of cleaning single unit HEPA filters extremely unattractive.

In larger, multi-unit filter systems, single filter units can be isolated and periodically taken "off stream" for cleaning. However, such a system will be obviously more complex and costly than a basic multi-unit system in which the particulate air can be supplied to a simple inlet plenum feeding a number of filter units in open, parallel arrangement. In addition, if a filter must be taken off stream for periodic cleaning, the remainder of the system may have to be designed to handle the full volume particulate air flow and may, as a result, be larger and more costly.

A particularly troublesome problem exists with HEPA filters which are cleaned by vibrating or agitating the filter, especially when this method is employed without simultaneous backflushing with clean air. Within practical limits of vibrating time and at frequencies recommended by filter system manufacturers, cleaning efficiencies have been found to be quite poor and, as a result, an inordinately rapid build-up of particulates on the filter media occurs which cannot be reduced to acceptable levels. Thus, the filters must be operated at higher than necessary pressure differentials and their effective lives are substantially shortened.

SUMMARY OF THE INVENTION

It has been discovered that a HEPA filter or a multi-unit HEPA filter bank can be effectively and efficiently cleaned by applying a vacuum or induced draft air flow through a nozzle to a small area of the inlet face of the filter while restricting or retarding the flow of particulate air through that small area. The typical HEPA filter construction includes cells formed by spaced separators which, in combination with the interspaced filter media, provide essentially two-cell modules. One or more of these modules can be separately cleaned as the vacuum nozzle is caused to slowly traverse the inlet face of the filter.

A HEPA filter can be cleaned by the apparatus and method of this invention without interrupting the normal flow of particulate air through it. The cleaning is more efficient than known backflushing methods. Power consumption is reduced substantially by the reduction to and maintenance of a lower average pressure loss across the filter, and the overall filter life can be lengthened considerably.

DESCRIPTION OF THE PREFERRED EMBODIMENT

Figure 1:
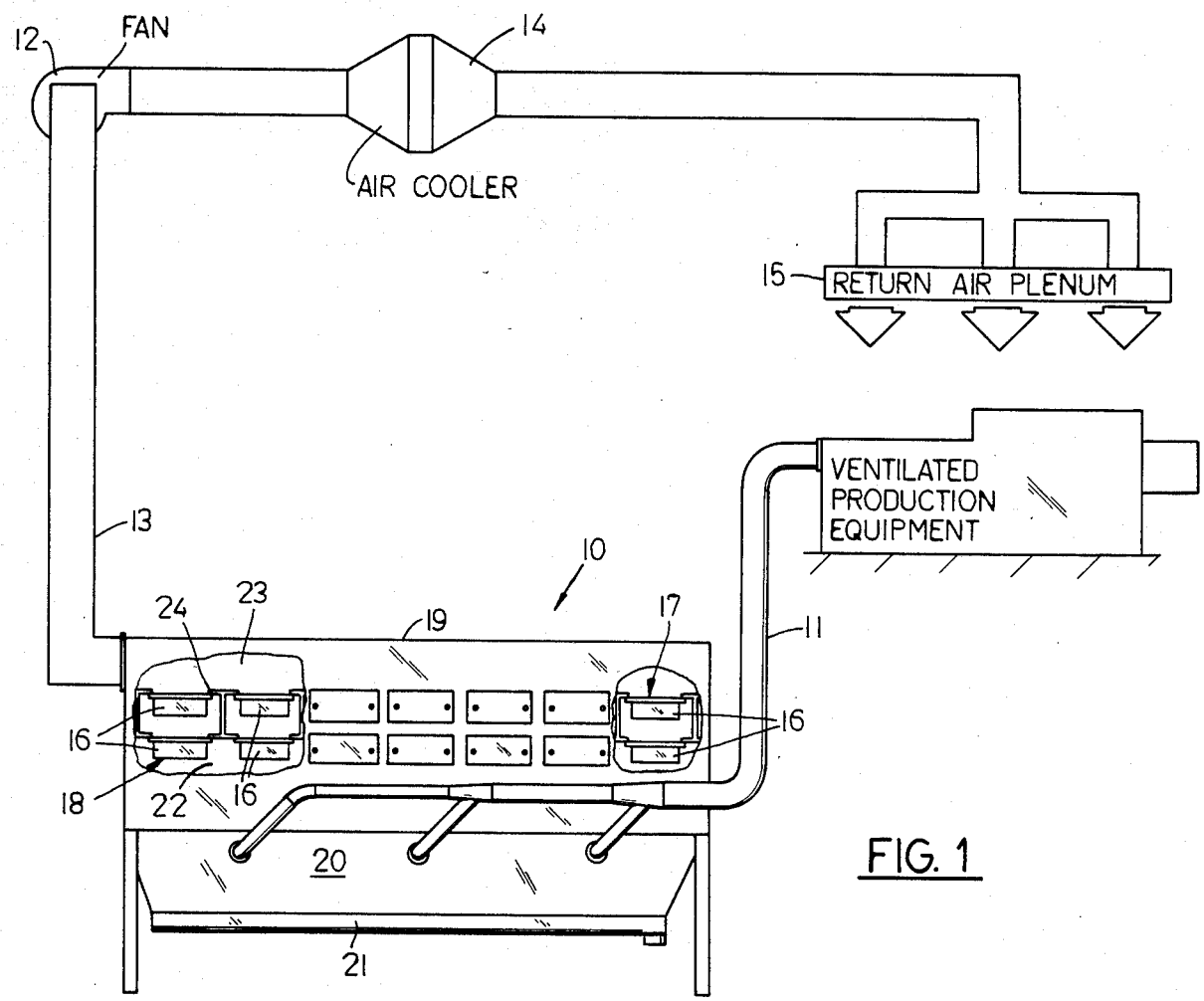
FIG. 1 is a schematic view of a filter unit, including the filter cleaning apparatus of the present invention, shown in a typical system for ventilating and returning filtered air to a process station.

FIG. 1 shows the general arrangement of a filter system for which the filter cleaning apparatus and method of the present invention are particularly adapted. For example, such a system is used to filter toxic lead oxide dust generated by equipment used to paste or assemble plates for storage battery construction. It will be appreciated, however, that this system and the apparatus and method of the invention disclosed herein are adaptable for use in a wide range of systems for filtering toxic or otherwise hazardous particulates from process air or gases, as well as systems in which the particulates are recovered for recyling or other use.

In FIG. 1, the particulate-laden air is drawn from the process station to the filter unit 10 via a supply duct 11 by a pressure head provided by an induced draft fan 12 located in the clean air exhaust duct 13 extending from the filter unit outlet. The filtered air is returned through the fan 12 and, if required, an air cooler 14 to a return air plenum 15 over the process station.

The filter unit 10 contains two banks of high efficiency particulate air filters 16 (commonly referred to as HEPA filters) with seven filters in each bank, although other arrangements, including units with only a single filter 16, are common. Flow of particulate air through the unit 10 and filters 16 is upward and each filter in the upper bank 17 is connected in series with the corresponding filter in the lower bank 18 (and preferably isolated from each other upper bank filter). However, the upper bank 17 comprises a secondary filter system to act strictly as a back-up in the event of damage to or failure of a primary filter in the lower bank 18. The upper bank filters receive virtually no particulates and do not, therefore, require any periodic cleaning.

The filter unit 10 includes a closed rectangular casing 19 and a tapered bin bottom 20 which may contain a horizontal screw or other conveyor 21, primarily for removing the heavier particulates which may drop out of the air stream. The interior of the casing 19 is divided into a lower particulate air plenum 22 on the inlet side of the filters 16 in lower bank 18 and an upper clean air plenum 23 on the outlet side of the filters in upper bank 17. An intermediate filter supporting structure 24 is fixed to the interior of the casing 19 and the filters 16 of both banks are demountably attached to appropriate openings 25 in the structure 24, all in a sealed manner so as to absolutely preclude any passage of air therethrough, except directly through the filters 16. The supporting structure 24 preferably includes vertical spacers 26 so that the secondary filters are isolated from each other and each receives clean air from only its corresponding primary filter. The particulate air plenum 22 is directly open to all primary filters 16 in the lower bank 18 and this complete open access to the filter inlets is advantageously used for mounting and operating the filter cleaning apparatus now to be described.

The filter cleaning apparatus 28 includes a vacuum nozzle 30 mounted closely adjacent the inlet faces 32 of the primary filters 16 in the lower bank 18. The nozzle 30 is adapted to be maintained closely adjacent the filter faces and to be moved across each filter face and sequentially across the entire lower bank 18 of filters. Each end of the nozzle 30 is fixed to the inside flange 33 of a mounting bracket 34. Each mounting bracket 34 is preferably in the shape of an asymmetric channel with the intermediate web 36 disposed horizontally generally in the plane of the filter face 32 to engage and ride along the outer edge 38 of one side 40 of the rectangular filter frame 42.

Figure 6:
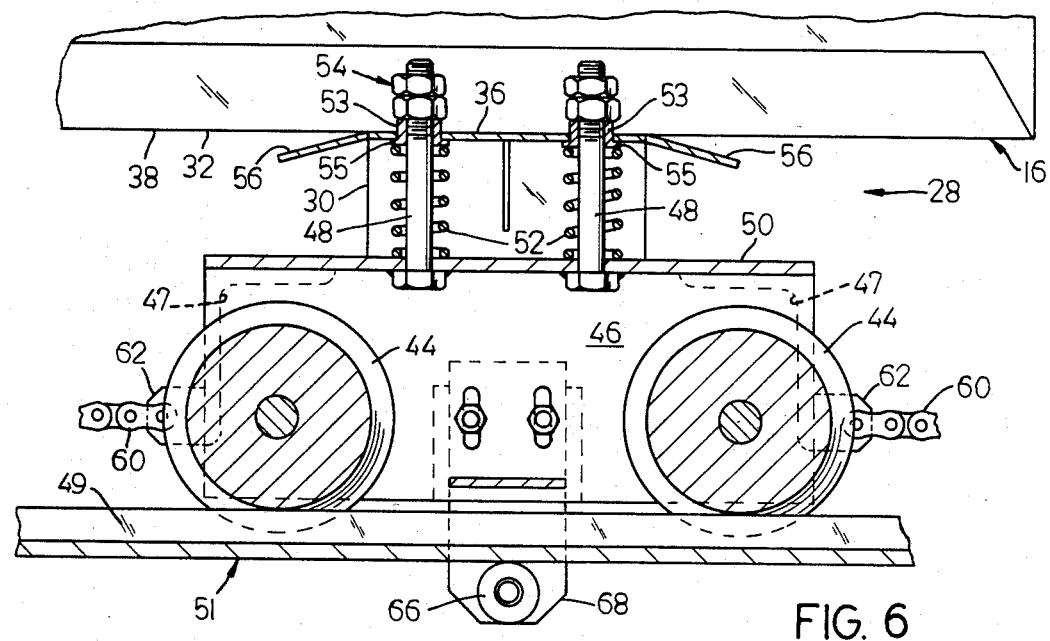
FIG. 6 is a vertical sectional view taken on line 6—6 of FIG. 3.

Each mounting bracket 34 is attached by its intermediate web 36 to a nozzle carriage. The nozzle carriage includes a pair of grooved wheels 44 journaled in a wheel housing 46 beneath each mounting bracket 34. The wheel housings are connected by a pair of transverse angle members 47 disposed parallel to and on each side of the nozzle 30. The wheels 44 are supported for movement within the particulate air plenum 22 along the full length of the lower filter bank 18 by a pair of tracks 49 fixed to a track support structure 51 mounted to the interior of each side of the filter casing 19. A pair of mounting bolts 48 extend upwardly through a top plate 50 in each wheel housing 46 and pass freely through a pair of holes in the intermediate web 36 of each mounting bracket 34. As is seen best in FIG. 6, a compression spring 52 is disposed on the shank of each mounting bolt with the opposite ends of the spring bearing against wheel housing top plate 50 and the flange 55 of a busing 53 extending through the hole in intermediate web 36. A lock nut assembly 54 adjustably and resiliently attaches the mounting bracket 34 to each bolt 48 against the bias of its compression spring 52. In this manner, the height of the nozzle 30 may be adjusted such that the intermediate webs 36 of the mounting brackets 34 are maintained in sliding contact with the respective edges 38 of the filter frame and the resilience of the springs 52 allows constant contact to be maintained in the event of any irregularities which might be encountered on the contacting surfaces. In addition, both edges of the web 36, in the directions of carriage travel, include integral angled surfaces 56 to provide a smooth transition onto a contact surface irregularity or minor obstruction.

Figure 3:
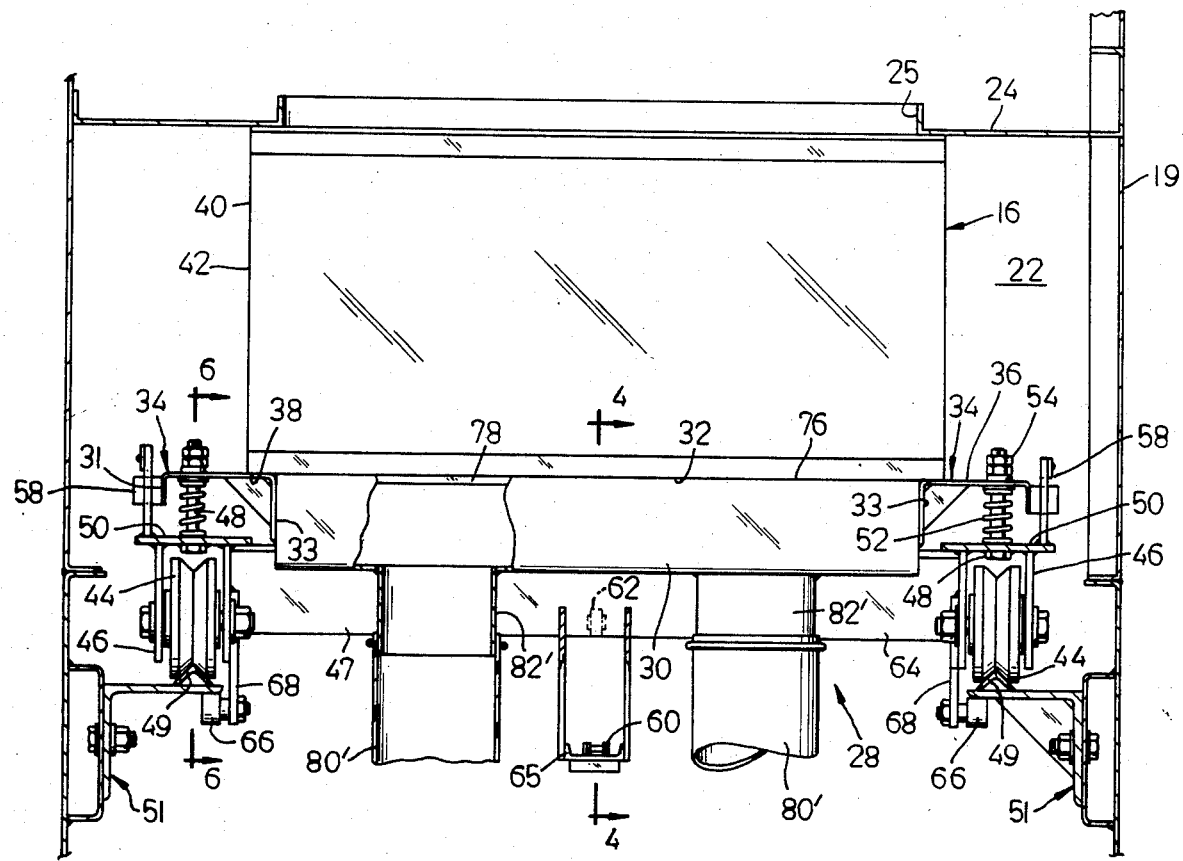
FIG. 3 is a vertical sectional view taken on line 3—3 of FIG. 2 showing details of the vacuum nozzle assembly.

Referring particularly to FIG. 3, in order to prevent lateral movement of the nozzle 30 with respect to the carriage and to provide a guide for vertical adjustment of the nozzle, a guide member 58 is attached to and extends upward vertically from each housing top plate 50. The inner face of the guide member 58 is disposed in sliding contact with the outer face of the outside flange 31 of mounting bracket 34. The upper end of guide member 58 may also serve as an actuator for limit switches mounted above the tracks 49 at either end of the filter bank 18 to limit the travel and reverse the direction of the filter cleaning apparatus 28.

As is variously shown in FIGS. 3–6, the nozzle 30 and the carriage on which it is mounted are moved together in either direction along the tracks 49 by a conveyor chain 60. The chain may be a single open strand of standard roller chain with each of its free ends attached to a lip 62 extending from the vertical legs 64 of angle members 47. The upper run of chain 60 extends from one lip 62 horizontally above and intermediate the tracks 49, around a drive or idler sprocket (not shown) mounted at one end the particulate air plenum, back beneath the upper chain run and over a chain catenary support plate 65 depending downwardly from the angle members 47, around another idler or drive sprocket (not shown) at the other end of the plenum, and back along the upper run to its attachment with the other lip 62. The chain drive sprocket may be driven in any conventional manner at speeds which will be detailed hereinafter.

To provide positive retention of the carriage wheels 44 on the tracks 49, small cam wheels 66, secured to the wheel housing 46 by legs 68, are disposed to contact and roll along the undersides of the track support structure 51 on both sides. Legs 68 may be vertically adjustable to compensate for wear or other variations in dimensions of the installed system.

Figure 2:
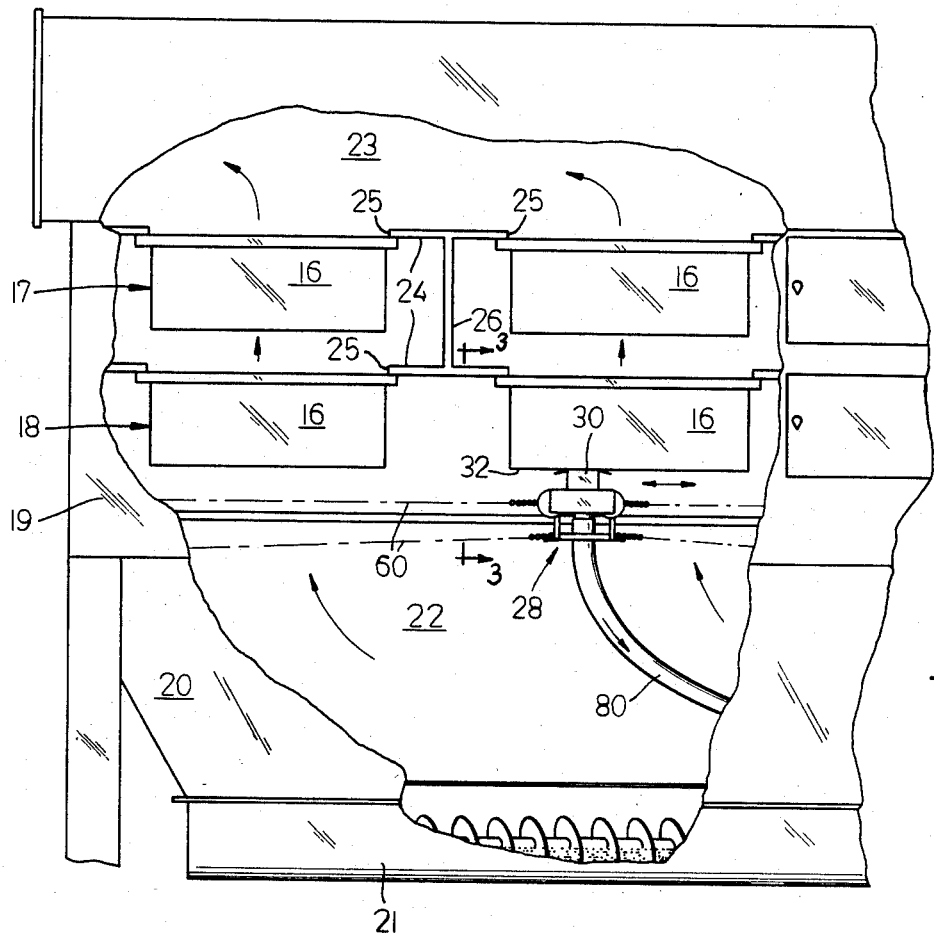
FIG. 2 is an enlarged side elevation view partially in section, of the filter unit and cleaning apparatus of FIG. 1.
Figure 7:
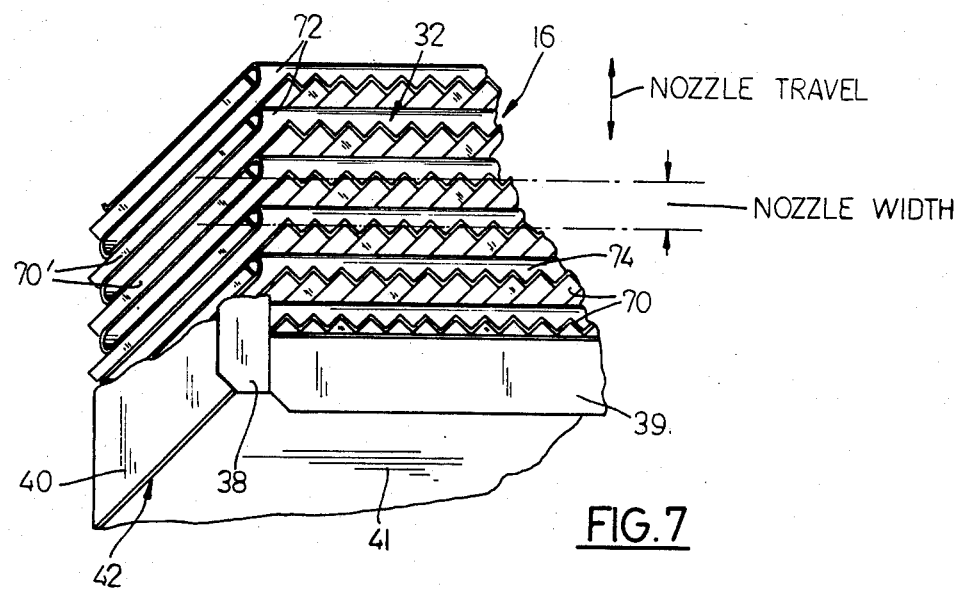
FIG. 7 is a perspective view with portions broken away showing the construction of a typical high efficiency particulate air filter.

FIG. 7 shows a high efficiency particulate air filter 16 of typical construction and which has been found to be especially well adapted to be cleaned by the disclosed apparatus and method. A generally rectangular frame 42 includes substantially planar sides 40 and ends 41. The sides and ends are typically provided with flanged outer edges 38 and 39, respectively, which are coplanar and define on the end the inlet face 32 of the filter 16. The flanges on the other (outlet) face of the frame 42 are used to mount the filter in the openings 25 of the filter support structure 24 (see FIG. 2).

A series of spaced impermeable separators 70 are attached at their lateral edges to and extend between the inner surfaces of opposite sides 40 of the frame 42. The separators 70 are generally parallel to one another and to the ends 41 of the frame and extend therethrough substantially from the inlet face 32 to the outlet face. The separators may be made of light guage aluminum or other suitable materials and are preferably corrugated with the corrugations or bend lines extending through the filter generally perpendicular to the filter faces. Within the frame, the separators form a series of long, narrow cells with their ends lying on or just inside the planes of the filter faces. The separators are also preferably grounded to the frames which are, in turn, grounded to the structural supports to eliminate any build-up of static electricity.

A continuous sheet of filter media 72 is wrapped in a serpentine pattern between adjacent separators and around the opposite ends of adjacent separators. In other words, the filter media 72 is disposed in a pleated configuration with a separator 70 disposed within each pleat. Thus, looking for example at the inlet face 32 of the filter of FIG. 7, the ends of alternate separators 70 are exposed and the ends of the separators 70' therebetween are covered by the filter media 72 wrapped around them. It has been found that alternate separators 70 (between which are interposed a separator 70' and two layers of filter media 72) define individual two-cell modules 74 which may be efficiently cleaned by passage of a vacuum nozzle 30 of a size and orientation to be described.

Figure 5:
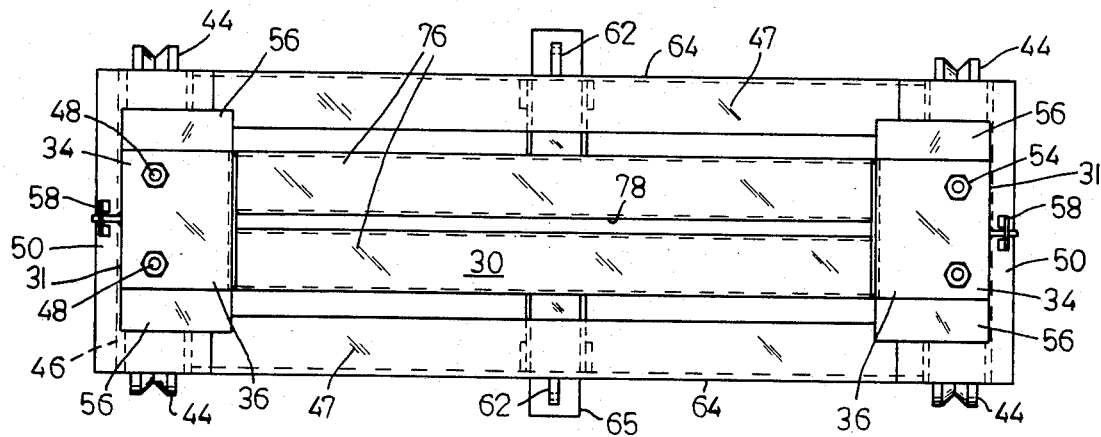
FIG. 5 is a top plan view of the nozzle assembly shown in FIGS. 3 and 4.
Figure 4:
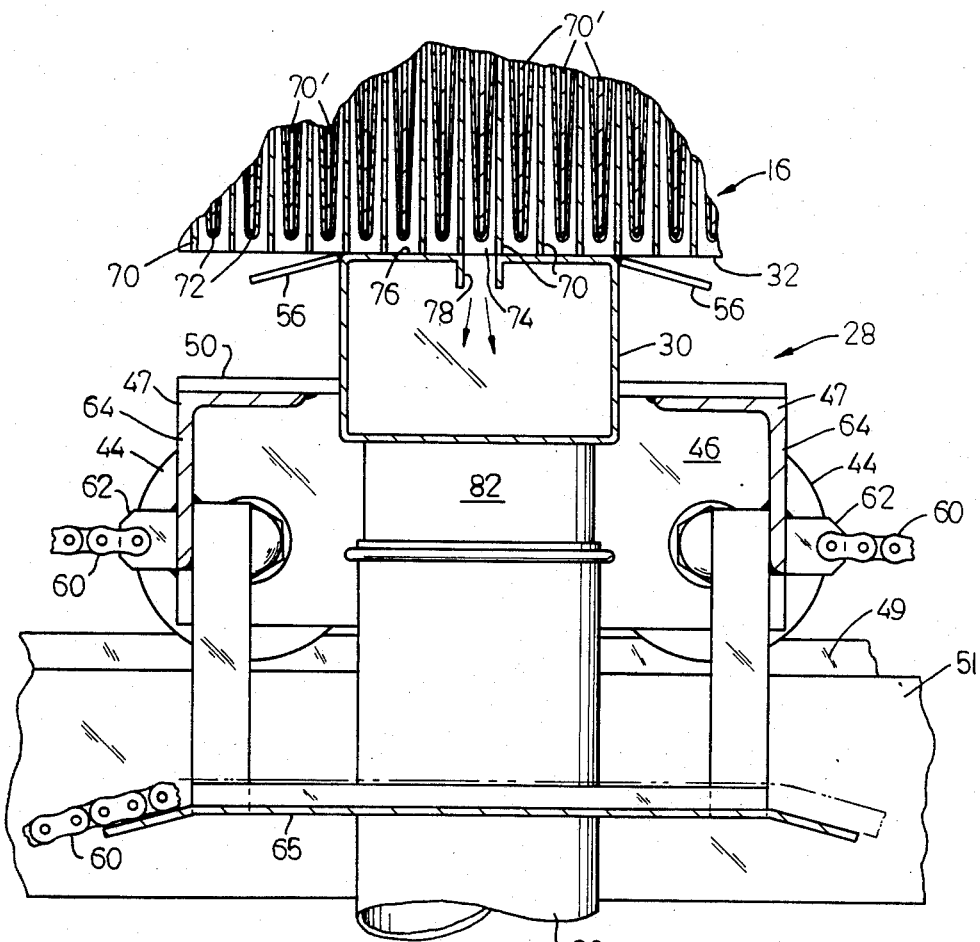
FIG. 4 is a vertical sectional view taken on line 4—4 of FIG. 3 and showing additional details of the nozzle and filter interface.

Referring particularly to FIGS. 4 and 5, the vacuum nozzle 30 has a generally rectangular cross section and a length between the mounting brackets 34 approximately equal to the distance across the inlet face 32 of the filter between the sides 40 thereof. The upper surface of the nozzle is flat and lies coplanar with the intermediate webs 36 of the mounting brackets. The upper surface includes a pair of flat baffle surfaces 76 extending across the full length of the nozzle, which defines and which extend in forward and rearward directions distances greater than the distance between alternate partitions between their adjacent edges a nozzle inlet 78. The nozzle inlet has a length extending the full length of the nozzle and a width, in its preferred embodiment, equal to the nominal width of a two-cell module 74 of the filter 16. Because of the corrugated configuration of the separators 70, the nominal width of a module 74 is considered as being the average distance between alternate separators 70. As best seen in FIG. 4, the nozzle is broad enough in the direction perpendicular to the nozzle inlet 78 to span a plurality of adjacent two-cell filter modules.

As the nozzle is caused to slowly traverse the inlet face of the filter in a direction perpendicular to the separators 70, the nozzle inlet 78 effectively spans and isolates a single two-cell module 74. Preferably, the baffle surfaces 76 make light contact with the exposed ends of the alternate separators 70. However, owing to filter design variations or manufacturing tolerances, the exposed ends of the separators are sometimes recessed slightly from the plane of the filter face. Whether the baffle surfaces 76 actually contact the separator ends or are closely spaced therefrom, the baffle surfaces act to block or substantially retard the flow of particulate air in a generally vertical upward direction through the module 74 above the nozzle inlet 78. With the flow of particulate air so blocked or retarded, the application of a source of vacuum to the nozzle cause a reverse flow of clean air from the outlet side of the filter through the module 74 and nozzle inlet 78. The reverse air flow carries with it the particulates previously trapped on the filter media and backflushes the filter module. The filtering of particulate air through the entire filter, except the relatively minor portion covered by the nozzle, may continue during cleaning.

The vacuum air source is connected to the nozzle by a flexible hose 80 attached to one or more cylindrical connection flanges 82 opening to the bottom of the nozzle. With two connection flanges 82', as shown in FIG. 3, the hoses 80' may be short intermediate sections suitably attached to the main hose 80 with a "Y" or like connection (not shown). The hose 80 must be long and flexible enough to follow the cleaning apparatus 28 over the full length of the filter chamber.

A typical filter unit 10 of FIG. 1 includes seven primary filters 16 in the lower bank 18. Each of the filters has an effective filter face width and length of 22 inches (56 cm.). The nominal width of each two-cell module 74 within a filter (i.e. the average distance between alternate separators 70) is ½ inch (1.27 cm.). Correspondingly, the nozzle inlet is 22 inches long and ½ inch wide.

In operation of a typical system for filtering lead oxide dust, an air flow of 12,500 cfm. (5,900 liters/sec.) with a particulate loading of 0.018 grains/cubic foot (0.04 mg/liter) is supplied uniformly to the filter inlet faces 32 via the particulate air plenum 22. The filters are cleaned by applying a vacuum air flow through the nozzle inlet ranging from about 325 cfm. to preferably 550 cfm. (150–260 liters/sec.). The nozzle 30 is caused to traverse the unit at a speed of 5 feet per minute, making two full passes (back and forth once) in each 8 hour shift. Preferably, one pass is made every 4 hours with a total travel time per pass of approximately 5 minutes.

The vacuum air flow through the nozzle inlet will vary considerably with different types of particulates and with changes in grain loadings of the particulate-laden air. Particulates with greater densities require higher transport velocities and, therefore, higher volumes of air flow. Also, higher particulate grain loadings may require more frequent cleaning or slower nozzle travel speeds. In order to adequately convey lead oxide dust, for example, a minimum transport velocity of about 4,000 feet per minute is required. With a nozzle size described above and a vacuum air flow therethrough in the range of from 325 to 550 cfm., the corresponding air flow velocity will range from about 4,200 to 7,200 feet per minute.

Figure 8:
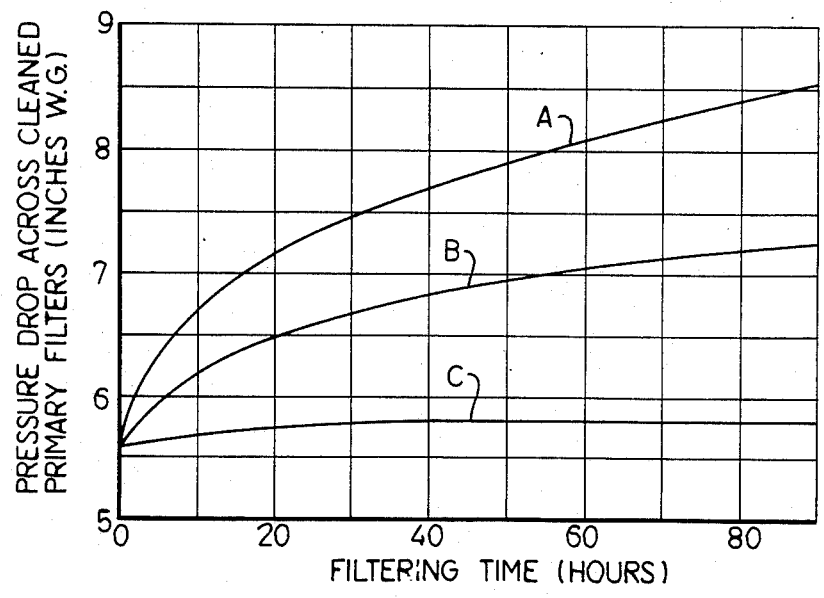
FIG. 8 is a graph of pressure differentials with filtering time across filters cleaned by prior art methods and the method and apparatus of the present invention.

Virtually total removal of particulates from the filter media has been attained with the apparatus and method of the present invention. Evidence of the cleaning efficiency of the disclosed vacuum cleaning system is indicated graphically in FIG. 8. The graph compares the variations in pressure drop with operating time across the primary filters in actual prodcution units cleaned by prior art apparatus and methods and by the system disclosed herein. The pressure differentials were measured after cleaning and plotted against total operating (filtering) time. All three units tested were seven-filter systems receiving approximately the same flows of air containing lead oxide particulates at the same grain loadings and operating at the same initial pressure drop across clean filters.

Curve A is for a unit which was cleaned by periodically stopping the flow of particulate air and vibrating the filters to shake the particulates therefrom and into the screw conveyor 21 for removal. This curve shows a steep initial rise in pressure drop and a subsequent tapering to a still relatively steep straight line increase. The curve not only indicates very poor cleaning efficiency, but a corresponding increase in power consumption to maintain the particulate air flow. It should also be pointed out that between cleaning cycles it is normal for the pressure differential to increase by as much as 2 inches w.g. (0.37 cm.Hg) and, within a relatively short period of operating time (e.g. 50–60 hours), such pressure differential "spikes" could reach the level of 10 inches w.g. at which filter failure is likely.

Curve B is for a unit identical to the curve A unit, but which was periodically cleaned by a combination of vibrating and simultaneous backflushing by reversing the flow of clean air through the filters. Some improvement in cleaning efficiency is noted, however, a similar build-up of particulates which are not removed by cleaning is indicated by the generally straight line increase in pressure differential with time. Though the filters in this unit should last longer than those of curve A, they would still have a quite limited life.

Curve C shows the pressure differential across the cleaned primary filters with time in a unit similar to the unit for which the data for curves A and B was taken, but which was cleaned by the method and apparatus of this invention. The curve is for one of four identical production units, each of which has exhibited similar filtering and cleaning characteristics during simultaneous operation over a period in excess of 500 hours. Apart from a slight initial increase in pressure drop, the curve shows a definite leveling or stablization of the pressure differential with time, indicating the virtual complete cleaning of HEPA filters in accordance with the teaching of this application.

The nozzle inlet width of ½ inch was selected to correspond to the width of a two-cell module 74, typical of HEPA filter designs. It has been found, however, that two or more modules 74 may be simultaneously cleaned by providing a nozzle with a wider inlet. The vacuum or cleaning air flow would have to be increased accordingly and some loss in cleaning efficiency might be found. Also, of course, the greater the area of the filter face that is covered by the nozzle, the greater the effect on the continuing flow of particulate air through the unit. With a nozzle constructed and operated in accordance with the preferred embodiment, no measurable effect on particulate air flow has been found.

Due to variations among the many manufactures in the details of construction of a HEPA filter of the type used in the system described herein, it is also possible to clean a filter with a nozzle having a narrower inlet. Thus, if the filter is constructed such that the filter media 72 in the area where it is wrapped around the edge of the separator 70' is extended outwardly to the exposed ends of the separators 70, a single cell defined by adjacent separators 70 and 70' (with a sheet of filter media 72 lying therebetween) can be effectively cleaned with a nozzle having an inlet 78 with a width of about one-half that of the preferred embodiment, or about ¼ inch. However, such a filter construction makes the exposed filter media more susceptible to damage by the passage of the nozzle across the filter face.

I claim:
1. In a filter system for removing particulate material from a flow of air including particulate air intake means in communication with a source of particulate-laden air and a clean air plenum for exhausting filtered air; a high efficiency particulate air filter disposed between the particulate air intake means and the clean air plenum, said filter being of the type having a rigid, generally rectangular frame defining an inlet face and an outlet face, a series of spaced substantially parallel separators attached at their lateral edges to and extending between opposite sides of the frame and disposed to form a series of open cells within the frame extending between the inlet and outlet faces, a continuous sheet of filter media wrapped in a serpentine pattern between adjacent separators and around the opposite ends thereof, such that the ends of alternate separators on at least the inlet face of the filter are exposed to define therebetween a series of two-cell filter modules, said alternate separators being impermeable to the flow of air; an improved apparatus for removing particulate material from the filter media comprising:
(1) a nozzle adapted to span the inlet face of the filter in the direction of the length of the filter cells and to span a plurality of adjacent two-cell filter modules;
(2) a nozzle inlet having a length substantially equal to the length of the cells and disposed generally parallel to and not exceeding a closely spaced relation to the ends of the alternate separators on the inlet face;
(3) the nozzle inlet having a width not greater than the nominal width of approximately two two-cell modules;
(4) a vacuum source operatively connected to the nozzle adapted to provide a clean air flow through a two-cell module opposite the flow of particulate air through the filter and sufficient to carry with it through the nozzle inlet a major amount of particulate material entrained on the filter media; and
(5) means for moving the nozzle across the filter face.
2. The apparatus of claim 1 wherein the clean air flow through the nozzle inlet is provided simultaneously with the flow of particulate air through the filter.
3. The apparatus of claim 1 wherein the volume of air flow through the nozzle inlet is at least equal to the volume of particulate air flow through one two-cell filter module.
4. The apparatus of claim 1 and further comprising means for positively limiting the approach of said nozzle to said filter.
5. The apparatus of claim 1 wherein the nozzle inlet has a width approximately equal to the nominal width of one cell.
6. The apparatus of claim 1 wherein said nozzle has planar surfaces ahead and behind said nozzle inlet in engagement with said filter, said planar surfaces extending in forward and rearward directions distances greater than the width of a two-cell filter module.
7. The apparatus of claim 1 wherein the end portions of the nozzle and the outer edges of the frame are in sliding contact.
8. The apparatus of claim 7 wherein the nozzle includes a pair of baffle surfaces extending in opposite directions from the nozzle inlet and having substantially flat surfaces disposed generally parallel to the filter inlet face.

9. The apparatus of claim 8 wherein each of said baffle surfaces has portions angled away from said filter in the direction of nozzle travel to provide a smooth transition onto an irregularity in said air filter.

10. The apparatus of claim 6 and further comprising means for maintaining the nozzle in contact with the sides of the frame, said means comprising:
   (1) a track-mounted nozzle carrriage and
   (2) a spring biased mounting means for adjustably attaching the nozzle to the carriage.

11. The apparatus of claim 10 and further comprising means for positvely retaining said nozzle carriage on its track.

12. The apparatus of claim 1 wherein the nozzle inlet has a width approximately equal to the nominal width of one two-cell filter module.

13. The apparatus of claim 12 wherein the ends of the alternate separators defining the two-cell filter modules extend outwardly no further than the plane of the filter inlet face.

14. In a filter system for removing particulate material from a flow of process ventilation air including a housing defining a particulate air plenum in communication with a source of particulate-laden air and a clean air plenum for exhausting filtered air; a high efficiency particulate air filter disposed within the housing between the particulate air plenum and the clean air plenum, said filter being of the type having a rigid, generally rectangular frame defining an inlet face and an outlet face, a series of spaced substantially parallel separators attached at their lateral edges to and extending between opposite sides of the frame and disposed to form a series of open cells within the frame extending between the inlet and outlet faces, a continuous sheet of filter media wrapped in a serpentine pattern between adjacent separators and around the opposite ends thereof, such that the ends of alternate separators on at least the inlet face of the filter extend outwardly beyond the filter media and are exposed to define therebetween a series of two-cell filter modules, said alternate separators being impermeable to the flow of air; the improved method for removing particulate material from the filter media comprising the steps of:
   (1) retarding the flow of particulate air through at least one two-cell filter module by placing a nozzle across the inlet face of the filter;
   (2) providing an inlet in the nozzle, said inlet having a length approximately equal to the length of the cells and a width not greater than the nominal width of approximately two two-cell filter modules;
   (3) applying a vacuum source to the nozzle to cause an air flow through the nozzle inlet opposite to the flow of particulate air and sufficient to remove a major amount of particulate material entrained in the filter media within at least one two-cell filter module;
   (4) moving the nozzle along the inlet face of the filter to sequentially clean serially adjacent modules; and,
   (5) maintaining the flow of particulate air through the major portion of the filter.

15. The method of claim 14 including the additional step of continuously recirculating clean air from the outlet of the filter.

16. The method of claim 14 wherein the velocity of the air flow through the inlet nozzle is at least equal to the minimum transport velocity of the particulate material.

17. The method of claim 14 wherein said inlet has a width approximately equal to the nominal width of a two-cell filter module.

18. An air filter and vacuum cleaning system including, in combination:
   (a) at least one filter unit comprising:
      (1) a housing having front, rear, left and right side walls defining rectangular bottom entrance and top exit openings;
      (2) a plurality of vertical partitions running between and secured to said left and right side walls, alternate partitions having their lower ends starting in the plane of the bottom entrance opening and terminating at their upper ends short of the plane of the top exit opening, the remaining partitions having their upper ends starting in the plane of said top exit opening and terminating short of the plane of said bottom entrance opening, each of said partitions being corrugated along vertical bend lines to present a zig-zag appearance in top plan cross section; and
      (3) a cloth-like fibrous filtering strip of width corresponding to the distance between said left and right side walls passing over the first of said alternate partitions, thence under the first of said remaining partitions, and continuing in an up and down manner to define upper folds about the ends of those partitions terminating short of the top exit opening and lower folds about the lower ends of those partitions terminating short of the bottom entrance opening, the portions of said strip between the upper and lower folds passing between the partitions being held in generally vertical parallel planes by said partitions, the corrugations defining with the strip a series of vertical channels of generally triangular cross section when viewed in plan;
   (b) means for limiting the approach of a vacuum head to be recited to said bottom entrance opening and
   (c) a vacuum cleaning means for removing accumulated impurities from said at least one filter unit including:
      (1) a pair of guide tracks running along parallel and adjacent to the lower ends of the left and right side walls of said filter unit housing;
      (2) a vacuum head for connection to a vacuum source mounted for movement along said tracks to pass under said bottom entrance opening of said housing adjacent to said bottom entrance opening, said head having a vacuum slot extending between said left and right walls parallel to said folds, said slot being narrower than the distance between said alternate partitions and having planar surfaces ahead and behind said slot in engagement with said at least one filter unit; and
      (3) means for moving said vacuum head along said bottom entrance opening between said front and rear walls of said filter unit housing so that said slot successively applies vacuum to the channels defined by the alternate corrugated partitions as it traverses the same, the channels and said slot cooperating to create a confined air movement in the channels of sufficient velocity to carry said impurities down the channels communicating with the slot opening, said impurities themselves acting as mechanical scrubbers in their movement along the sides of the channels to further clean the strip portions between the partitions, whereby said filter unit can be periodically cleaned by said vacuum system without mechanical shaking of the filters and without the necessity of disassembling the filter units.

19. A system according to claim 18 and further inculding means resiliently biasing said vacuum slot against said rectangular bottom entrance opening so that close contact between said vacuum slot and said rectangular bottom entrance opening is assured during travel of said head along said at least one filter unit.

20. A system according to claim 18 wherein said planar surfaces extend in forward and rearward directions distances greater than said distance between alternate partitions.

21. A system according to claim 18 and further including means resiliently biasing said nozzle against said rectangular bottom entrance opening so that close contact between said vacuum slot and said rectangular bottom entrance opening is assured during travel of said head along said at least one filter unit.

22. A system according to claim 18 in which there are included means engaging opposed longitudinal edges of the tracks to inhibit lateral movement of the vacuum head as it moves along the tracks.

23. A system according to claims 18 and further including (a) an impurity accumulating hopper coextensive with said units and positioned below the bottom entrance openings of the units for receiving impurities dropping by gravity and (b) an upper air guiding duct in communication with the exit openings of said units and including a blower for moving air through the filter units, said vacuum head being movable to clean said filter units without interrupting operation of said blower.

24. A system according to claim 18 or 22 in which there are provided a plurality of additional filter units each similar to said at least one filter unit in horizontal alignment, said tracks being coextensive with said units so that all of the filter units can be cleaned by a single pass of said vacuum head.

25. A system according to claim 24 and further including (a) an impurity accumulating hopper coextensive with said units and positioned below the bottom entrance openings of the units for receiving impurities dropping by gravity and (b) an upper air guiding duct in communication with the exit openings of said units and including a blower for moving air through the filter units, said vacuum head being movable to clean said filter units without interrupting operation of said blower.

* * * * *